(12) United States Patent
Wu (10) Patent No.: US 8,753,764 B2
(45) Date of Patent: Jun. 17, 2014

(54) BATTERY ASSEMBLY STRUCTURE (75) Inventor: Donald P. H. Wu, Hsinchu County (TW)

(73) Assignee: Energy Control Limited, Tortola (VG)

( * ) Notice: Subject to any disclaimer, the term of this patent is extended or adjusted under 35 U.S.C. 154(b) by 349 days.

(21) Appl. No.: 13/166,464

(22) Filed: Jun. 22, 2011

(65) Prior Publication Data

US 2012/0328914 A1 Dec. 27, 2012

(51) Int. Cl.
*H01M 6/42* (2006.01)

(52) U.S. Cl.
USPC .............................. 429/149; 429/163; 429/164

(58) Field of Classification Search
USPC ........................................................ 429/149
See application file for complete search history.

(56) References Cited

U.S. PATENT DOCUMENTS

| 7,670,718 B2 | 3/2010 | Wu | |
| 2009/0061298 A1 * | 3/2009 | Wu | ............................... 429/151 |

* cited by examiner

*Primary Examiner* — Ula C Ruddock
*Assistant Examiner* — Jacob Marks (57) ABSTRACT

A safe battery assembly structure comprises a plurality of secondary battery cells mounted on one side of a rack, and a positive guiding strip, a negative guiding strip, and a plurality of fuses mounted on the other side of the rack in such a manner that the secondary battery cells is electrically connected to the positive and negative guiding strips by the fuses and the connecting members, and each of secondary battery cells has its own fuse, so that the secondary battery cells are mounted on one side of the rack while the fuses and positive and negative guiding strips are all mounted on the other side of the rack, thus making it easy for visual checking, assembling, replacement, and maintenance of the components of the battery assembly, and also allowing a plurality of such battery assemblies to be safely arranged side by side or stacked on one another.

3 Claims, 8 Drawing Sheets

BATTERY ASSEMBLY STRUCTURE

BACKGROUND OF THE INVENTION

1. Field of the Invention

The present invention relates to a battery assembly, and more particularly to a safe battery assembly structure capable of safely collecting a plurality of secondary battery cells together.

2. Description of the Prior Art

Figure 1:
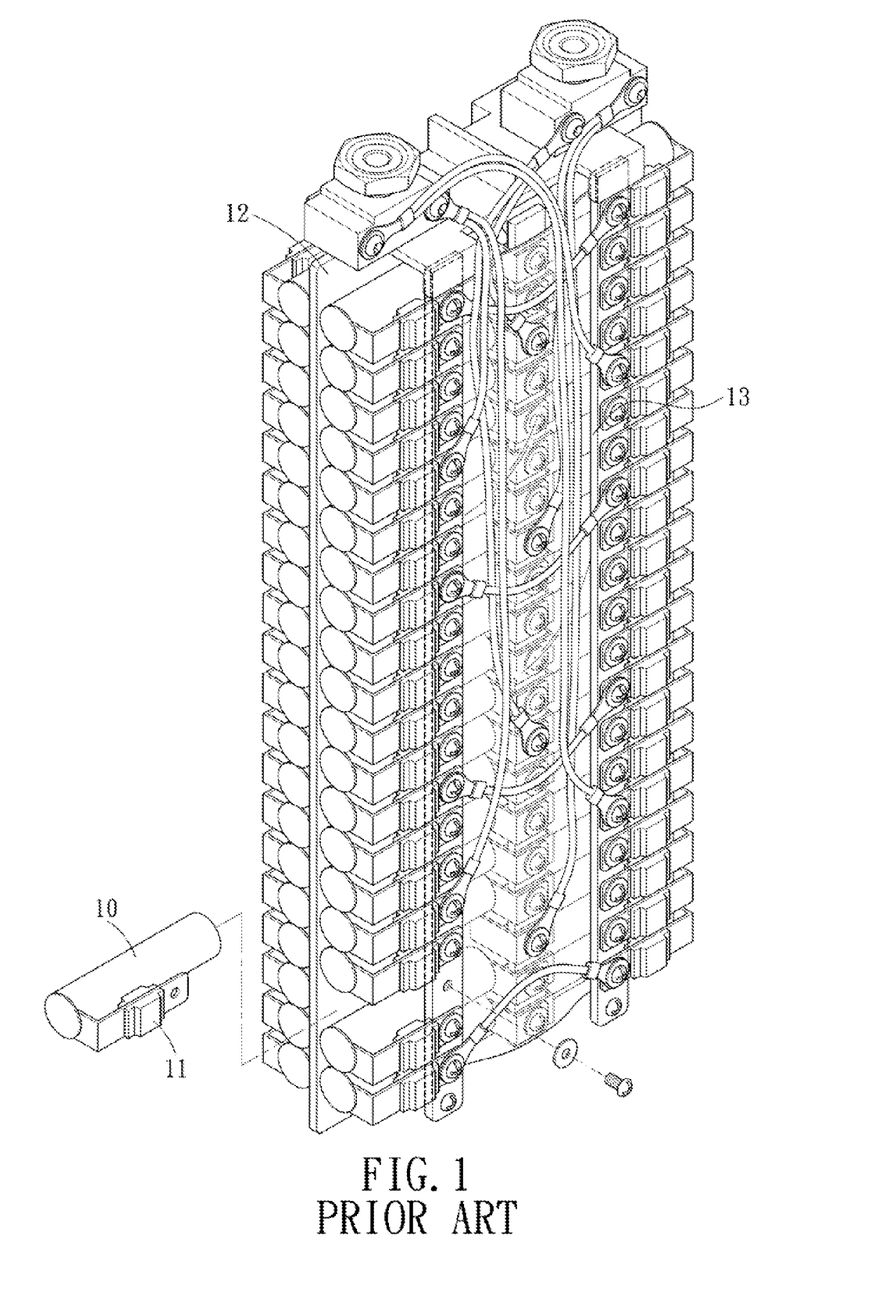
FIG. 1 is a perspective view of a conventional battery assembly disclosed in U.S. Pat. No. 7,670,718.

Referring to FIG. 1, a battery assembly disclosed in U.S. Pat. No. 7,670,718 which is a previous invention of the applicant of the present application comprises a plurality of secondary battery cells 10 and a corresponding number of independent fuses 11 mounted on an I-shaped rack 12.

The secondary battery cells 10 each are welded to a fuse 11, and then are connected in series or parallel by several guiding strips 13.

When any of the secondary battery cells 10 breaks down and causes the current flowing therethrough to exceed the rated value, the corresponding fuse directly connected to the broken secondary battery cell will cut off the broken secondary battery cell and separate it from other battery cells, preventing the entire battery assembly from being damaged.

However, the abovementioned battery assembly still needs to be improved for the reasons stated below:

Firstly, when a plurality of battery cells is mounted on the rack, the guiding strips protruding out of both lateral sides of the rack are likely to contact with each other causing short circuit. Furthermore, with this conventional rack, two battery assemblies cannot be used in a stacked-on-top-of-each-other manner.

Secondly, the batter cells are covered by and disposed on the inner surface of the fuses, sometimes, if any of the battery cells leaks or blows out while the corresponding fuse doesn't break, the condition of the battery cells, for example, any of the battery cells leaks or blows out, cannot be seen from outside and can only be checked by removing the battery cells and the fuses. Hence, the maintenance of this conventional battery assembly is inconvenient.

The present invention has arisen to mitigate and/or obviate the afore-described disadvantages.

SUMMARY OF THE INVENTION

The primary object of the present invention is to provide a battery assembly structure comprising a plurality of secondary battery cells mounted on one side of a rack and a plurality of fuses and positive and negative guiding strips mounted on the other side of the rack, such armaments make it easy for visual checking, assembling, replacement, and maintenance of the components of the battery assembly, and also allow a plurality of such battery assemblies to be safely arranged side by side or stacked on one another.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 2:
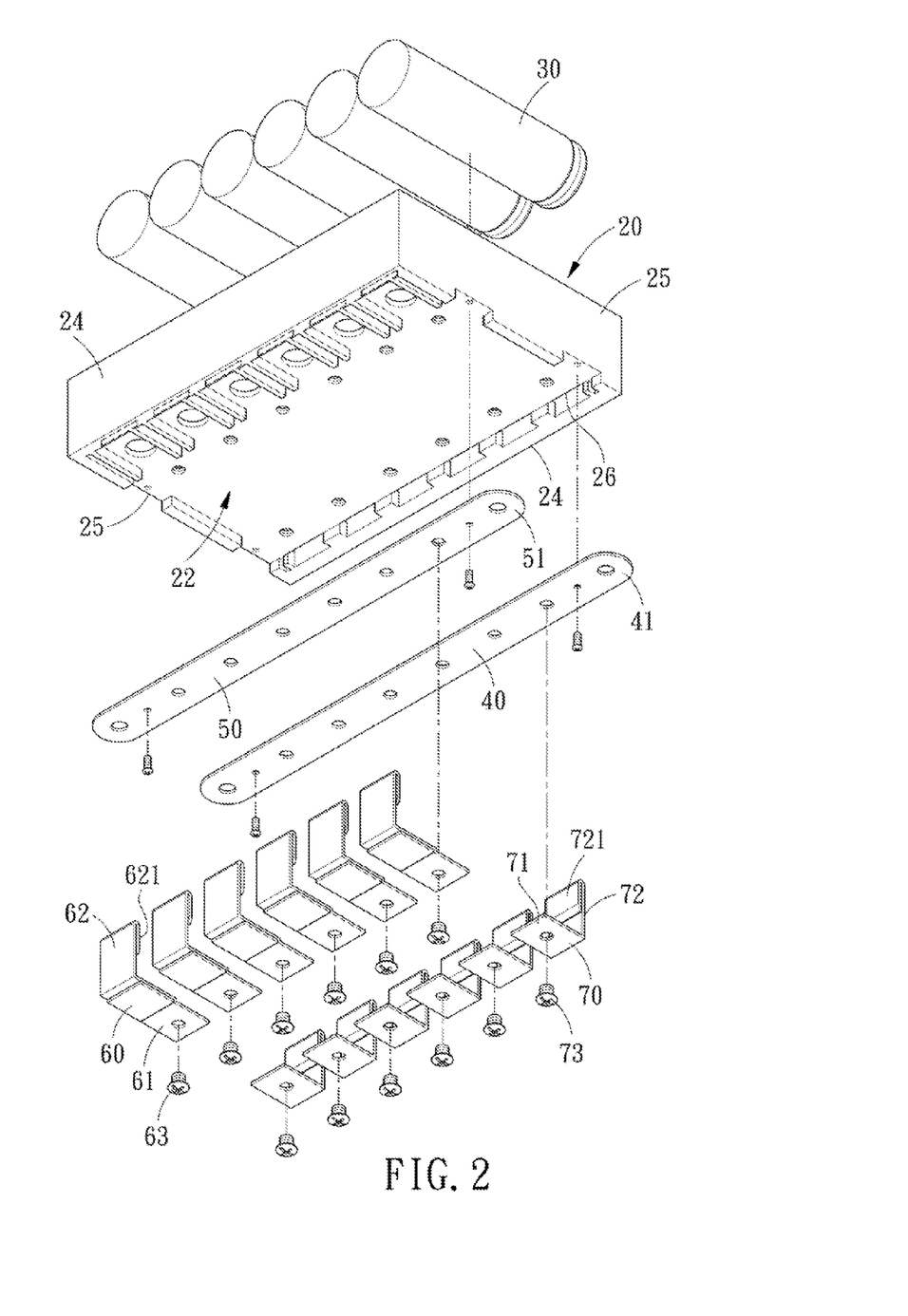
FIG. 2 is an exploded view of a battery assembly structure in accordance with the present invention.
Figure 3:
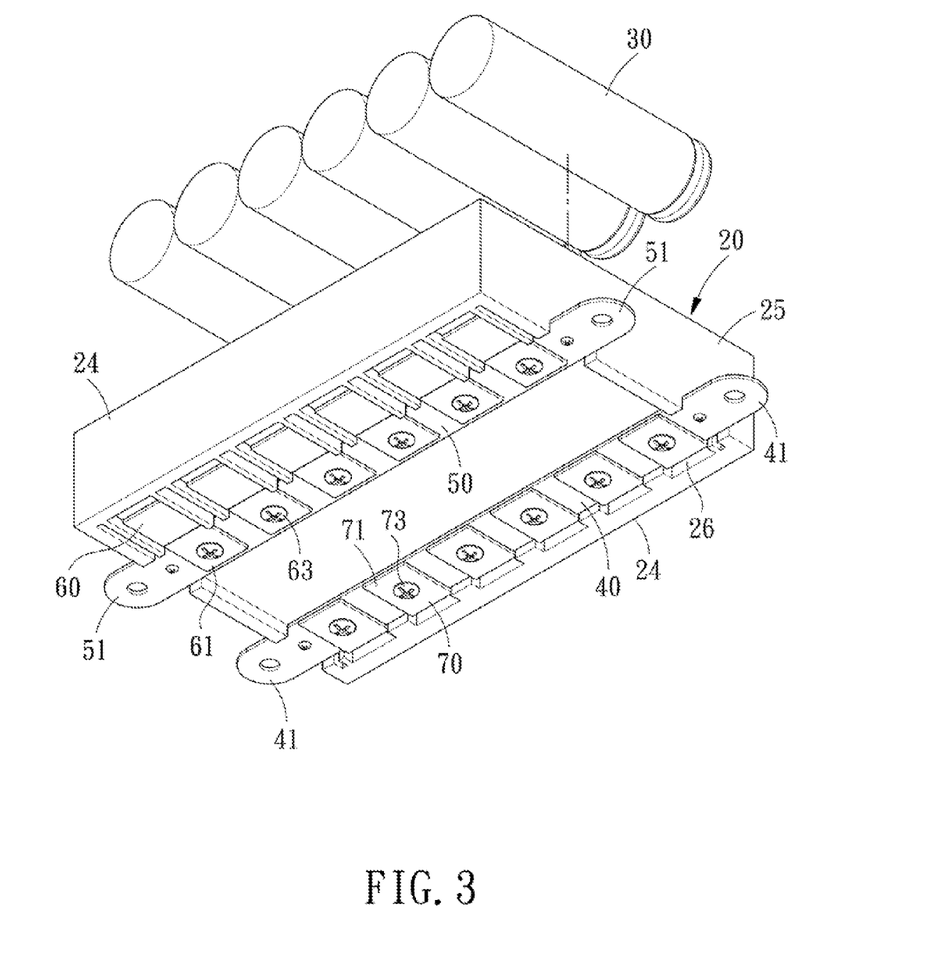
FIG. 3 is a partial exploded view of the battery assembly structure in accordance with the present invention.
Figure 4:
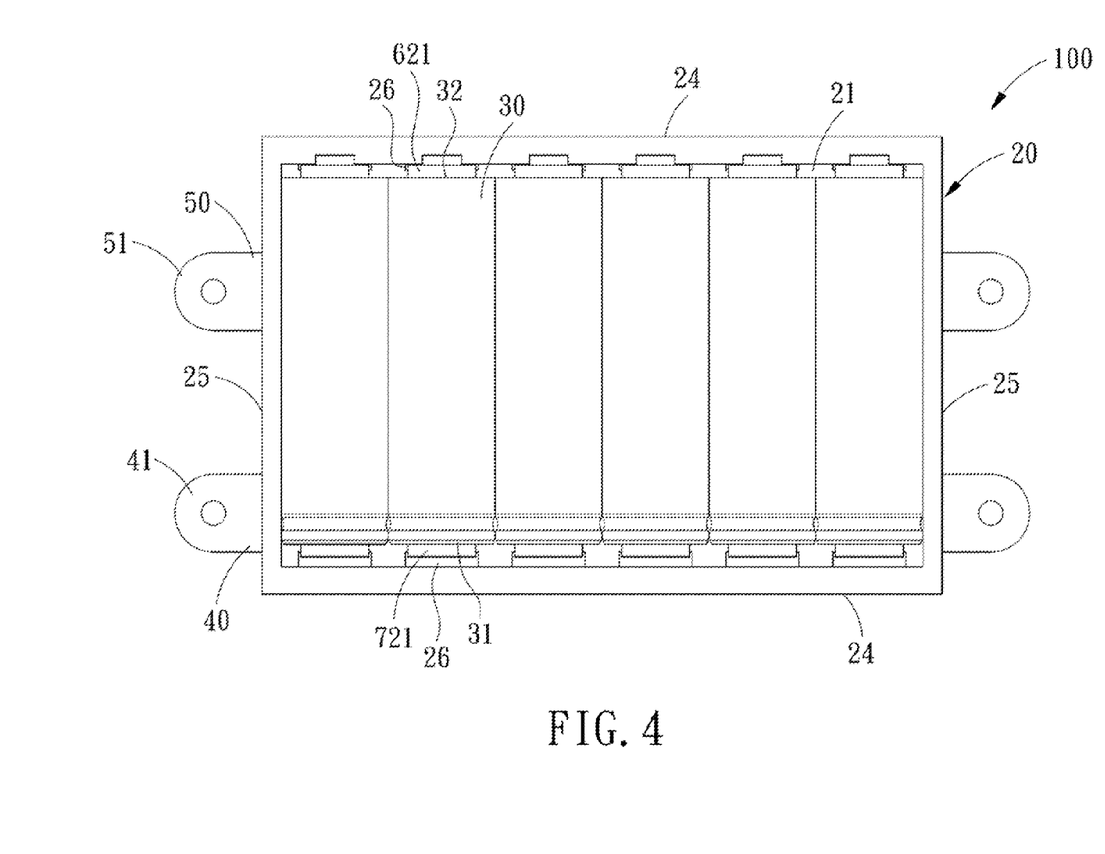
FIG. 4 is an illustrative view of the present invention showing that the secondary battery cells are disposed in the receiving chamber.

Referring to FIGS. 2-4, a safe battery assembly structure essentially comprises a rack 20, a plurality of secondary battery, cells 30, a positive guiding strip 40, a negative guiding strip 50, a plurality of fuses 60, and a plurality of connecting members 70. The secondary battery cells 30 are mounted on one side of the rack 20, and the positive guiding strip 40, the negative guiding strip 50, and the fuses 60 are mounted on the other side of the rack 20 in such a manner that the secondary battery cells 30 are electrically connected to the positive and negative guiding strips 40, 50 by the fuses 60 and the connecting members 70, and each of secondary battery cells 30 has its own fuse 60.

The rack 20 is provided with a receiving chamber 21 and a mounting surface 22 on both sides thereof. The receiving chamber 21 is a quadrangle structure consisting of two opposite longitudinal sides 24 and two opposite transverse sides 25, and the mounting surface 22 is located on the opposite side of the bottom 23 of the receiving chamber 21. A plurality of holes 26 penetrating from the receiving chamber 21 to the mounting surface 22 are formed in the bottom 23 and located adjacent the two longitudinal sides 24.

The secondary battery cells 30 are disposed side by side in the receiving chamber 21 in such a manner that the positive terminals 31 of the secondary battery cells 30 are located toward one longitudinal side 24 and the negative terminals 32 are arranged toward the other longitudinal side 24.

The positive guiding strip 40 is mounted on the mounting surface 22 of the rack 20 and includes a positive output terminal 41 formed at an end thereof.

The negative guiding strip 50 is mounted on the mounting surface 22 of the rack 20 and includes a negative output terminal 51 formed at an end thereof.

The fuses 60 are mounted on the mounting surface 22 of the rack 20 and each include two linking ends 61 and 62. Each fuse 60 has one of its linking ends 61 and 62 fixed to the positive or negative guiding strips 40 and 50 by a screw 63 and has the other one of the linking ends 61, 62 inserted into the receiving chamber 21 via the hole 26 and then folded into an folding end 621 to be connected to the positive or negative terminals 31, 32 of the secondary battery cells 30, so that each of the secondary battery cells 30 has its own fuse 60.

The connecting members 70 are mounted on the mounting surface 22 of the rack 20 and each includes two connecting ends 71, 72. One of the connecting ends 71, 72 is fixed to the positive or negative guiding strips 40 and 50 by a screw 73, and the other one of the connecting ends 71, 72 is inserted into the receiving chamber 21 via the hole 26 and then folded into an folding end 721 to be connected to the positive or negative terminals 31, 32 of the secondary battery cells 30, so that a battery assembly 100 is completed.

Figure 5:
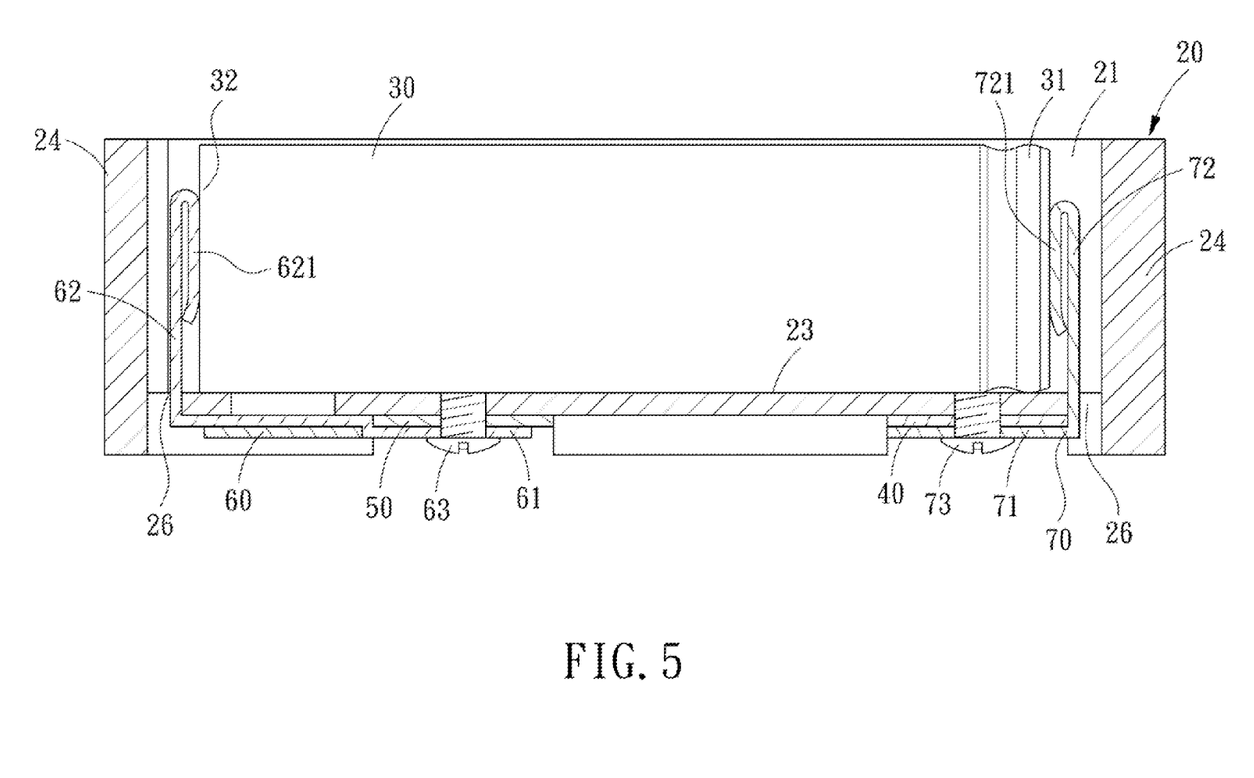
FIG. 5 is a cross sectional view of the battery assembly structure in accordance with the present invention.

The above is about the essential structural relations of the components of the present invention, for a better understanding of function and operation of the present invention, reference should be made to FIGS. 4 and 5. After the fuses 60, the connecting members 70, and the positive and negative guiding strips 40, 50 are mounted on the rack 20, the secondary battery cells 30 can be disposed in the receiving chamber 21. It is to be notated that one linking end 62 of the fuses 60 and the connecting end 72 of the connecting members 70 are inserted into the receiving chamber 21 and folded into a folding end 621, 721, and the secondary battery cells 30 are positioned in the receiving chamber 21 without welding, making it easier for installation and maintenance of the battery cells 30.

Referring then to FIGS. 3 and 4, the fuses 60 and the positive and negative guiding strips 40, 50 are all disposed on the mounting surface 22 of the rack 20, which makes it easy for visual checking of the fuses 60 as well as easy assembling, replacement, and maintenance of the battery cells and the fuses.

Referring then to FIG. 4, the secondary battery cells 30 are orderly arranged and exposed out of the rack 20 after being disposed in the receiving chamber 21, which makes it easier for future visual check.

Figure 6:
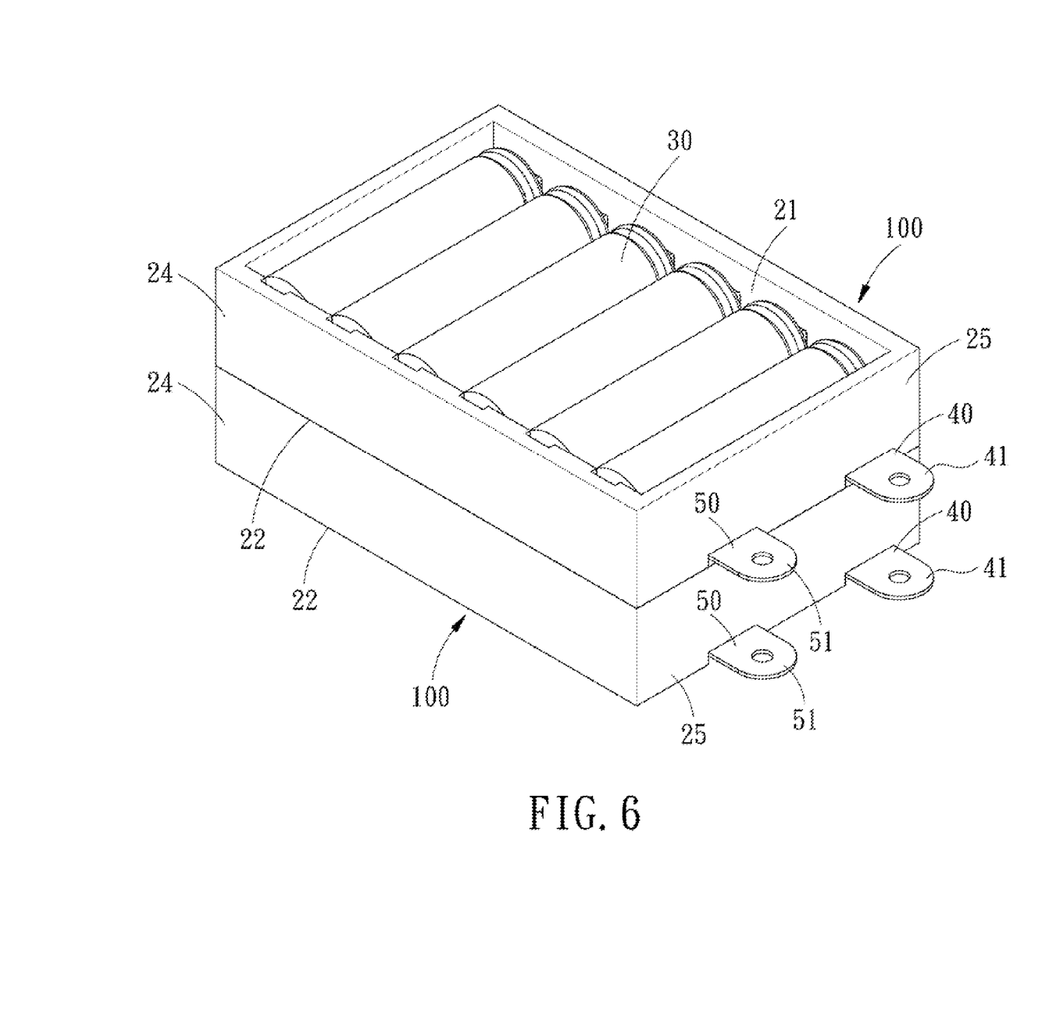
FIG. 6 is an illustrative view of the present invention showing that two battery assemblies are stacked on each other.

In addition, since the exposed secondary battery cells 30 are not covered by any of the guiding strips 40, 50, as shown in FIG. 6, two battery assemblies 100 in according to the present invention can be stacked on top of each other, and it can prevent the guiding strips 40, 50 of different battery assembly from contacting each other and causing short circuit.

Figure 7:
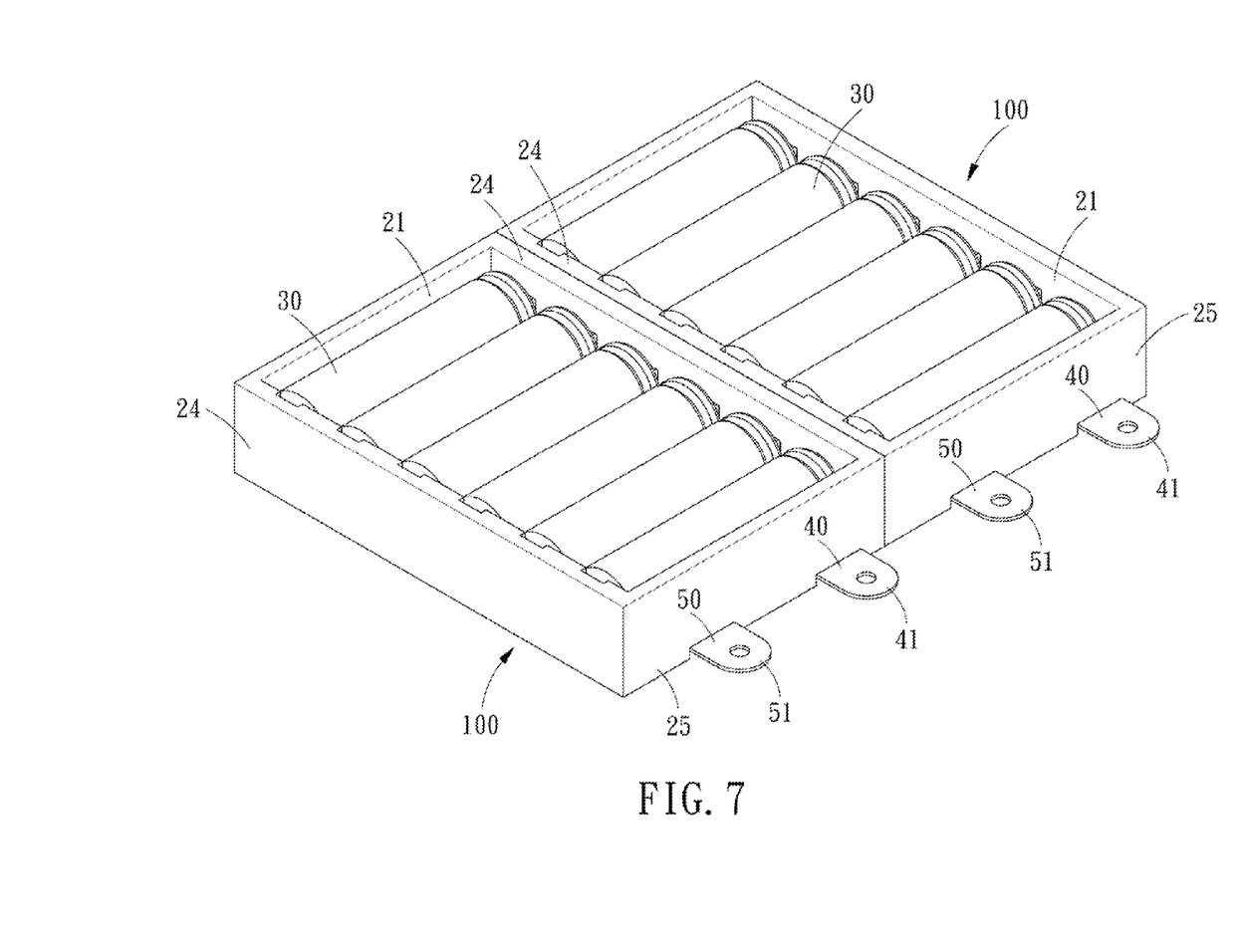
FIG. 7 is an illustrative view of the present invention showing that two battery assemblies are arranged longitudinal side by longitudinal side.

Referring then to FIG. 7, two of the battery assemblies 100 in according to the present invention can be used by abutting the longitudinal sides 24 against each other.

Figure 8:
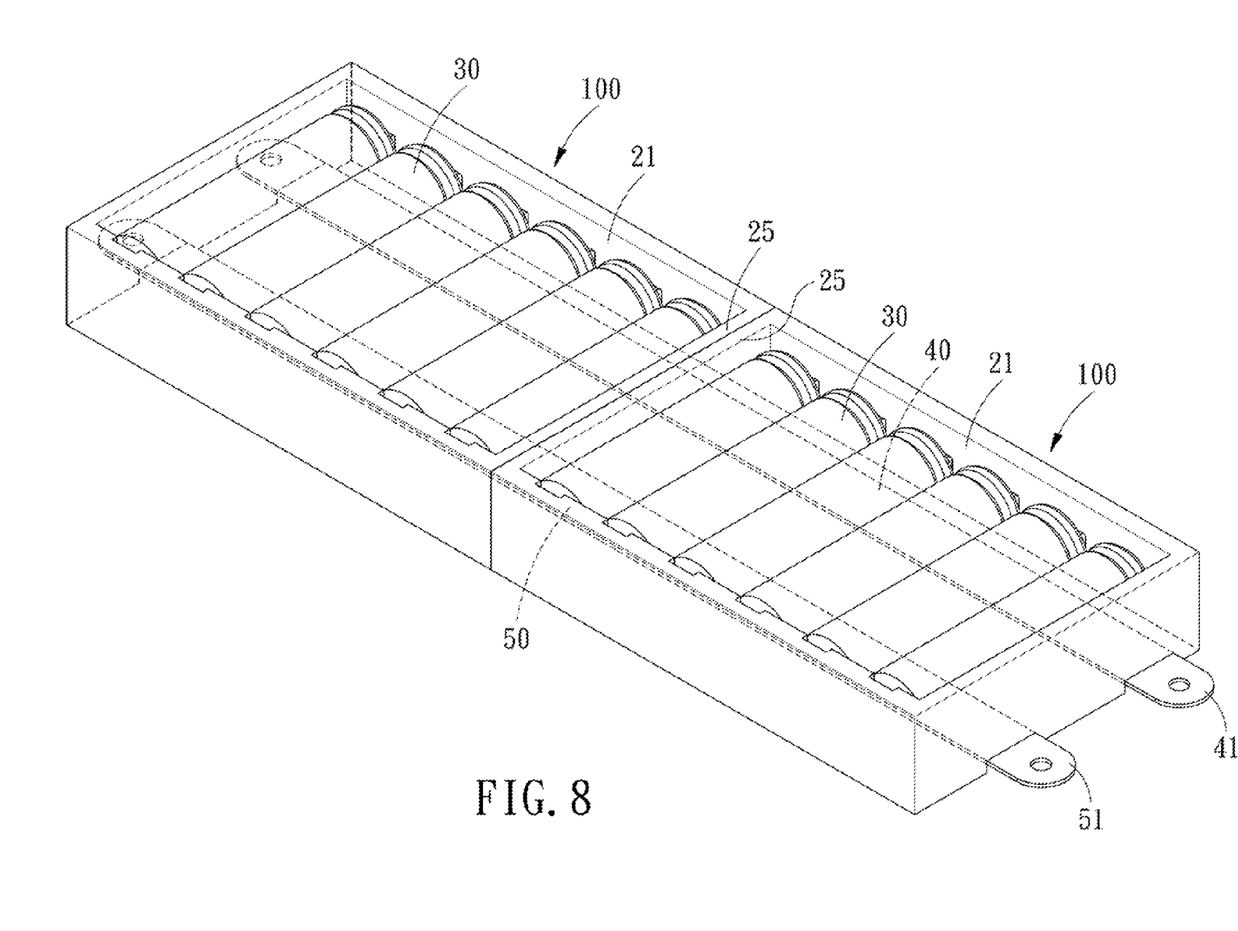
FIG. 8 is an illustrative view of the present invention showing that two battery assemblies are arranged transverse side by transverse side.

Referring finally to FIG. 8, two of the battery assemblies 100 in according to the present invention can also be arranged side by side, wherein the abutting the transverse sides 25 are against each other, and the two battery assemblies 100 can share one pair of positive and negative guiding strips 40 and 50.

While we have shown and described various embodiments in accordance with the present invention, it is clear to those skilled in the art that further embodiments may be made without departing from the scope of the present invention.

What is claimed is:

1. A battery assembly structure, comprising:
   a rack with a receiving chamber and a mounting surface on both sides thereof, the receiving chamber being a quadrangle structure consisting of two opposite longitudinal sides and two opposite transverse sides, and the mounting surface being located on an opposite side of a bottom of the receiving chamber, a plurality of holes penetrating from the receiving chamber to the mounting surface being formed in the bottom of the receiving chamber and located adjacent the two longitudinal sides;
   a plurality of secondary battery cells disposed side by side in the receiving chamber in such a manner that positive terminals of the secondary battery cells are located toward one longitudinal side and negative terminals of the secondary cells are arranged toward the other longitudinal side;
   a positive guiding strip mounted on the mounting surface of the rack and including a positive output terminal formed at an end thereof;
   a negative guiding strip mounted on the mounting surface of the rack and including a negative output terminal formed at an end thereof;
   a plurality of fuses mounted on the mounting surface of the rack and each including two linking ends, each fuse having one of its linking ends fixed to the positive or negative guiding strips and having another one of the linking ends inserted into the receiving chamber via the holes and then connected to the positive or negative terminals of the secondary battery cells, so that each of the secondary battery cells has its own fuse;
   a plurality of connecting members mounted on the mounting surface of the rack and each including two connecting ends, one of the connecting ends of each of the connecting members being fixed to the positive or negative guiding strips, and another one of the connecting ends being inserted into the receiving chamber via the hole and then connected to the positive or negative terminals of the secondary battery cells, so that a battery assembly is completed.

2. The battery assembly structure as claimed in claim 1, wherein the one of the connecting ends of each of the connecting members is fixed to the positive or negative guiding strips by a screw, and the one of the linking ends of each of the fuses is also fixed to the positive or negative guiding strips by a screw.

3. The battery assembly structure as claimed in claim 1, wherein each fuse has the another one of the linking ends inserted into the receiving chamber via the holes and then folded into an folding end to be connected to the positive or negative terminals of the secondary battery cells, and the another one of the connecting ends of the connecting members is inserted into the receiving chamber via the holes and then connected to the positive or negative terminals of the secondary battery cells.

* * * * *